Aug. 21, 1923.
J. M. FITZ GERALD
LIGHT PROJECTION
Filed Nov. 21, 1921
1,465,468
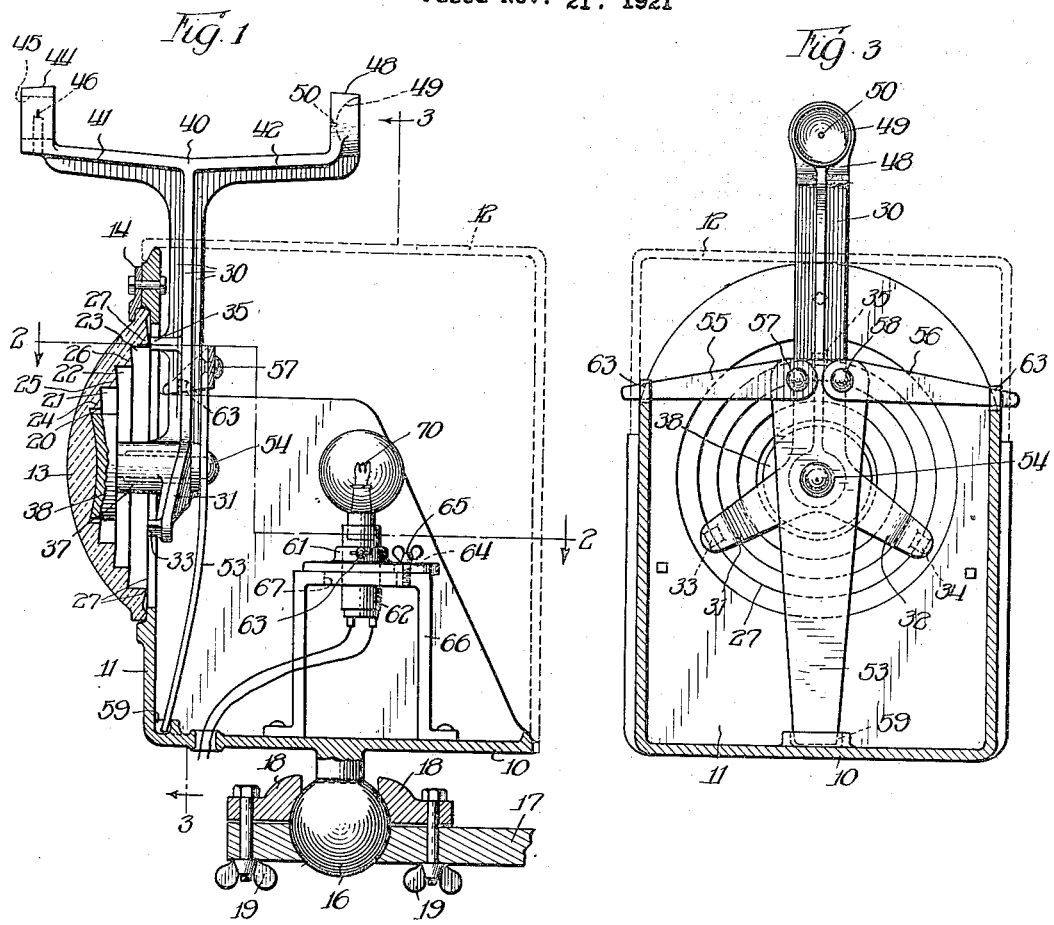
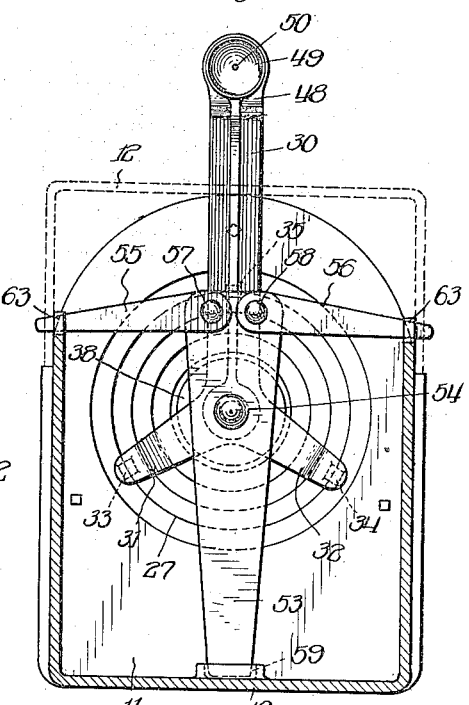
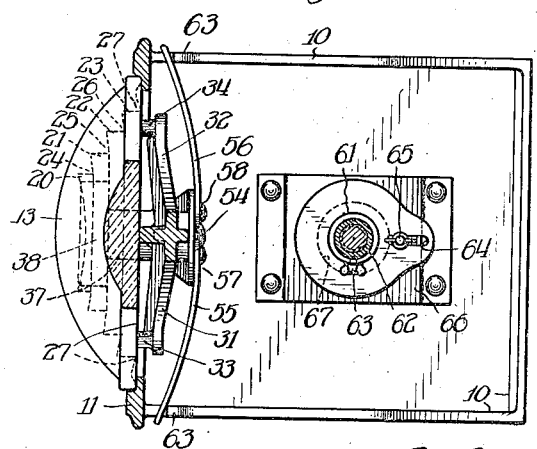
Witness:
R. Burkhardt
Inventor:
John M. FitzGerald
By Luther Johns
Atty.

Patented Aug. 21, 1923.

1,465,468

UNITED STATES PATENT OFFICE.

JOHN M. FITZ GERALD, OF RIVER FOREST, ILLINOIS.

LIGHT PROJECTION.

Application filed November 21, 1921. Serial No. 516,771.

*To all whom it may concern:*

Be it known that I, JOHN M. FITZ GERALD, a citizen of the United States, residing at River Forest, Cook County, Illinois, have invented certain new and useful Improvements relating to Light Projection, of which the following is a specification.

These improvements have to do with the projection of light through a lens, as in a lantern having a projecting lens and a source of light. The general objects are to facilitate an accurate direction of the optical axis of the lens and the proper focusing of the source of light.

These improvements will be described more specifically with respect to a signal lantern of the kind used along the railway right-of-way. In that art it is customary to use corrugated projecting lenses of the kind shown in the accompanying drawings and which are held upon the lantern body by a clamping ring in the manner shown. Such lantern bodies are usually of cast iron, and owing to the yielding nature of the sand in which the body is cast, quite marked variations exist in the castings and the lens in no case can be assumed to have its optical axis at right angles with the front wall or parallel with the bottom or side walls of the lantern casing when the lens is secured thereto in the usual way. Machining the lens seat for accuracy involves too much cost.

When the lantern is being installed according to the usual way, the lens is directed generally toward the desired place, which may be several hundred yards down the track, this operation being one largely of guess-work unless an effective sighting device be employed. It has been suggested to provide in that connection a sighting device attached to or made a part of the lantern body. An objection to the use of such a sighting device is that unless the lens seat be machined to provide a rest surface for the lens at right angles to the line defined by the sighting device the desired accurate lens-directing results cannot be had owing to variations in the castings as hereinabove pointed out.

According to the older practice, after the lens has been directed as well as possible under the conditions mentioned the source of light is adjusted by a man at the lantern who receives signals from an observer down the track indicating the results of the adjustments being made. The desideratum is that the observer shall see the lens uniformly filled with light as viewed from the predetermined position, which is supposed to be substantially at the optical axis of the lens.

It is almost impossible to obtain the desired accurate results by the older method described, except by accident, for with the optical axis of the lens improperly directed the subsequent adjustment of the source of light proceeds on an incorrect basis, and the operator, by aiming to get the lens filled with light from the position of the observer, makes an adjustment which, while it may approximate what is desired for that particular position of the observer, is still more incorrect with respect to other positions on the track, and even at the given position the full effect of the light is not obtained. In short, the result is the partial correction of one error by other errors in focusing the lamp.

According to these improvements the optical axis of the lens may first be determined accurately, in a simple and easy manner, and thereafter when the observer down the track notes the desired substantially equal refraction of light from the lens the lamp adjustments then made are for the highest efficiency of the lantern for that installation.

It is an object also to provide an improved form of sighting device which may be applied to a lantern to determine the optical axis of its lens, and, in a preferred form, a sighting device which may readily be removed from the lantern, especially where the construction is such that the removal of the sighting instrument is essential to the focusing of the source of light and the use of the lantern. Other objects and advantages will appear hereinafter.

In the drawings referred to and which form a part of this specification, Figure 1 is a medial vertical section through a lantern and lens of conventional form, the cover portion being shown by dotted lines, a sighting instrument containing my invention being shown in full lines operatively in position; Fig. 2 is a sectional top view of the device of Fig. 1 as on the broken line 2—2 thereof; and Fig. 3 is a rear end sectional view as on the line 3—3 of Fig. 1.

The lantern body 10 having a front wall 11 and a removable cover 12, together with the corrugated projecting lens 13 and its retaining ring 14 may be assumed to be of ordinary form. For purposes of convenient illustration I have shown, as means for holding the lantern in various positions of adjustment, a ball 16 held on the lantern support 17 by a pair of clamps 18. By releasing the thumb screws 19 the lens carried by the lantern body may be directed as desired, and by tightening these two nuts the lantern is held in any given position.

The lens 13 has a middle circular recess 20 and a plurality of annular and larger recesses 21, 22 and 23 defined by corrugations 24, 25, 26 and 27. The edges of these several corrugations are on planes at right angles to the optical axis A—B of the lens.

My present improvements contemplate the application to the lens, instead of to the lantern body, of a sighting device whereby the optical axis of the lens may be accurately directed regardless of the inaccuracy of its position with respect to the lantern body. The sighting device illustrated comprises a support or body member 30 having a pair of arms 31 and 32 carrying respectively a foot or rest element 33 and 34, there being a similar foot or rest element 35 projecting from the body 30 and having a similar rest surface. The rest surfaces on the feet 33, 34 and 35 are shown as being spaced-apart one-third of a circumference and are so positioned radially that they will impinge a surface of the lens which is at right angles to the optical axis, they being shown as impinging upon the edge of the outermost corrugation 27.

I preferably also add a centering or positioning member which is part of the casting of the body or support 30 and comprises first the stem 37 and next the circular disc-like head 38 adapted to enter loosely the middle recess 20 of the lens, one of its functions being to position the rest members in their proper relation to the lens when the device is applied.

A sighting device 40 having a forwardly-projecting arm 41 and a rearwardly-projecting arm 42 is integral with the main body or support 30 and lies in fore-and-aft directions above the lantern when in use, it being understood that the removable cover 12 of the lantern body is laid aside during the adjustment operations. The arm 41 has an upright projection 44 which is bored with a relatively large hole 45 into which extends the sighting pin having a small tip 46 on the line of sight. The rear arm 42 has an upright extension 48 which is cup-shaped at 49 and provided with a peep hole 50 in line with the point of the pin 46. The line between the peep hole 50 and the sight at 46 is at right angles with the rest surfaces on the feet 33, 34 and 35, and is thereafter at right angles also with the plane of the edge surfaces on the corrugation 27, and the sight line is also therefore parallel with the optical axis A—B of the lens.

In some uses of such a device it may be feasible simply to hold the sighting device against the lens for a moment to determine the then direction of the optical axis, thereafter making an adjustment of the lantern body as a whole or of the lens alone in case the lens should be mounted adjustably, then again simply holding the sighting device in place and thus determining whether a further adjustment is required. Preferably, however, I provide means for holding the sighting device firmly upon the lens throughout the sighting and lens-adjusting operation, and the means shown include an up-and-down spring bar 53 pivotally mounted at 54 on the axis of the stem 37 and head 38. The upper end of the spring 53 carries two lateral springs 55 and 56 pivoted respectively at 57 and 58 to the spring member 53. When the device is positioned for use the lower end of the spring 53 is inserted in a small pocket 59 formed in the bottom wall of the housing and the laterally-extending springs 55 and 56 are respectively moved in front of small projecting catches 63 formed upon the top edges of the side walls of the lantern body. The pressure of the three springs is thus communicated to the sighting device centrally of the feet 33, 34 and 35 and holds them against the lens firmly. An important advantage of the construction in this respect is that the sighting device may be rocked bodily on the pivot 54 from one side of the lantern to the other, and thus provision is made for directing the line of vision past obstructions which are very likely to be found in front and at a side of the lens 13, such as roundels of differently-colored glass and their carrying frame.

When it is desired to remove the sighting device the spring arms 55 and 56 are simply raised out of engagement with the catches 63 and thereupon the entire device may be lifted away. The arms 55 and 56 may then be folded upon the spring 53 and the spring 53 may be swung around with its smaller end near the sighting member, thus bringing the device into more compact form when not in use.

The source of light 70 will be assumed to be substantially at the focus of the lens 13. Such lamps are usually mounted for adjustment in various directions and for convenience of illustration I have shown lamp-adjustment features comprising the plate like support 61 vertically bored to permit the cylindrical lamp base 62 to fit slidingly therein, a set screw 63 holding the source 70 in various up-and-down adjustments. The support 61 has a fore-and-aft slot 64 through which passes the wing-headed bolt 65 screwed into the frame 66 which has a relatively large opening 67 to allow for movement of the base 62 therein. The source of light 70 may thus be adjusted in both fore-and-aft, lateral, and up-and-down directions through the mechanism pointed out.

I contemplate as being within the improvements herein set forth various departures from what is specifically illustrated and described, as indicated in the appended claims.

I claim:

1. A sighting device having means adapting it to be held upon a surface of a lens having an optical axis, and having means for defining a line of vision substantially parallel to the optical axis of the lens when the sighting device is normally held upon a surface of the lens.

2. A sighting device for a lens having an optical axis and surfaces in a plane substantially at right angles to such optical axis, which comprises in combination a supporting member, means carried by said supporting member adapted to rest against such surfaces of the lens, and a sighting member carried by the device having means for defining a line of vision which is substantially at right angles to the plane of such lens surfaces and therefore substantially parallel to the optical axis when the sighting device is normally applied to such lens.

3. A sighting device for a lens having spaced-apart surfaces substantially in a plane at right angles to the optical axis of the lens, which comprises in combination a support, a plurality of spaced-apart rest members carried by said support and adapted to rest against said surfaces of the lens, and a sighting member carried by the device having means for defining a line of vision which is substantially at right angles to the plane of said lens surfaces, and means for releasably holding the rest surfaces against said lens surfaces while the device is in use.

4. A sighting device for a lens having surfaces substantially in a plane at right angles to the optical axis of the lens, which comprises in combination a support, a plurality of rest members carried by said support and adapted to rest against said surfaces of the lens, spring members carried by the support adapted to engage catch members for releasably holding the rest members of the device against the said surface of the lens, and a sighting member carried by the device for defining a line of vision substantially at right angles to the plane of the rest members where they are adapted to rest against the lens.

5. A sighting device of the character described adapted to be applied to a corrugated lens of the character described having in one general surface thereof a central recess and annular surfaces on greater diameters respectively than that of said recess, said device comprising a central positioning member adapted to enter such a central recess, means providing a plurality of rest surfaces carried by the device and adapted to rest against the face of one of such annular surfaces of the lens, a sighting member defining a line of vision which is substantially at right angles to the plane of the rest surfaces of the device when the device is normally applied to the lens, and means for holding the device with its rest surfaces in engagement with the lens.

6. A sighting device of the character described comprising a supporting member, a positioning member carried by the supporting member and adapted to enter and be held by a recess of a corrugated lens of the character described, a plurality of spaced-apart rest members carried by said supporting member and adapted respectively to engage an annular surface defined by a corrugation of the lens, said rest members being adapted to slide upon the lens when the supporting member is rocked, means pivotally mounted upon the device substantially on the axis of the positioning member for releasably holding said supporting member for relative rocking movement with its rest members against said lens surface, and sighting means carried by the supporting member for defining a line of vision which is substantially at right angles to the plane of the rest surfaces which are adapted to rest against the lens.

JOHN M. FITZ GERALD.